United States Patent
Eastman, III et al.

(10) Patent No.: US 6,179,558 B1
(45) Date of Patent: Jan. 30, 2001

(54) FILTERING PUMP ASSEMBLY

(75) Inventors: Robert Eastman, III, Fenton; Jeffrey Allan Pestrue, St. Louis, both of MI (US)

(73) Assignee: The Game Tracker, Inc., Flushing, MI (US)

( * ) Notice: Under 35 U.S.C. 154(b), the term of this patent shall be extended for 0 days.

(21) Appl. No.: 09/391,864

(22) Filed: Sep. 8, 1999

(51) Int. Cl.⁷ ........................................................ F01D 1/00
(52) U.S. Cl. .................. 415/121.2; 417/234; 417/423.6; 417/423.9; 417/424.1
(58) Field of Search .............................. 415/121.1, 121.2, 415/206; 416/70 R; 417/234, 374, 423.6, 423.9

(56) References Cited

U.S. PATENT DOCUMENTS

| 2,280,626 | * | 4/1942 | Carpenter | 417/424.1 |
| 2,330,336 | * | 9/1943 | Crites | 417/424.1 |
| 2,997,957 | * | 8/1961 | Hall | 415/121.2 |
| 4,230,440 | * | 10/1980 | Niedermeyer | 417/424 |
| 4,475,872 | * | 10/1984 | Foughty | 417/315 |
| 5,202,021 | * | 4/1993 | Griffin et al. | 210/232 |

* cited by examiner

Primary Examiner—Edward K. Look
Assistant Examiner—James M McAleenan
(74) Attorney, Agent, or Firm—Carrier, Blackman & Associates, P.C.; William D. Blackman; Joseph P. Carrier

(57) ABSTRACT

A filtering pump assembly for pumping and filtering a fluid includes a pump subassembly and a filter subassembly. The pump subassembly has an inlet portion with a first cross-sectional shape. The preferred cross-sectional shape of the inlet portion is circular. The filter subassembly includes a foraminous cage member, having an opening formed therein of a shape corresponding to the first cross-sectional shape of the inlet portion and being configured to fit engagably thereon. The filter subassembly also includes a filter element formed of a porous material for placement in covering relation to the cage member. The preferred filter element is either bag-shaped or formed as a cylindrical sleeve. Preferably, the filter assembly includes a retainer for retaining the filter element in covering relation to the cage member. The retainer may be an annular spring clip having two ends which overlap one another, and having a finger grip formed at each end thereof.

15 Claims, 2 Drawing Sheets

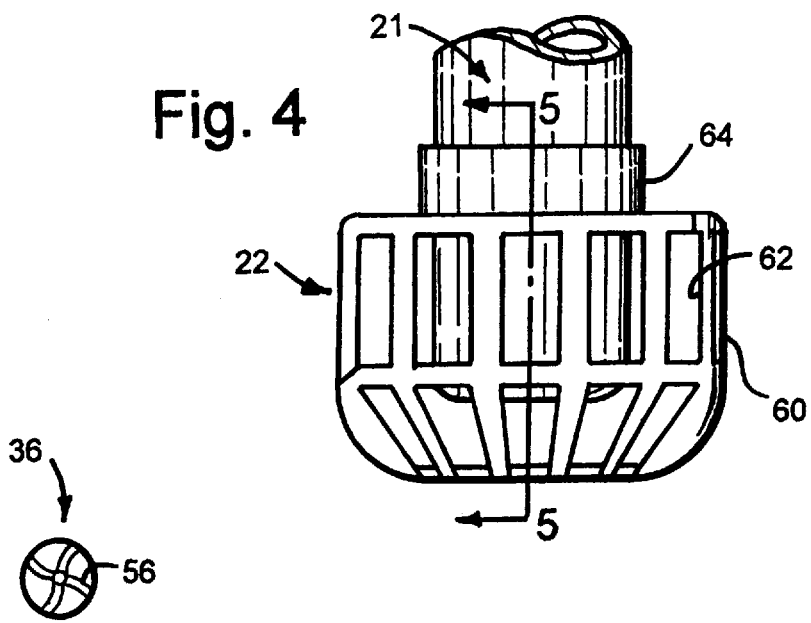
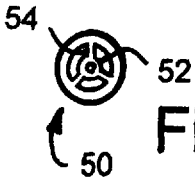
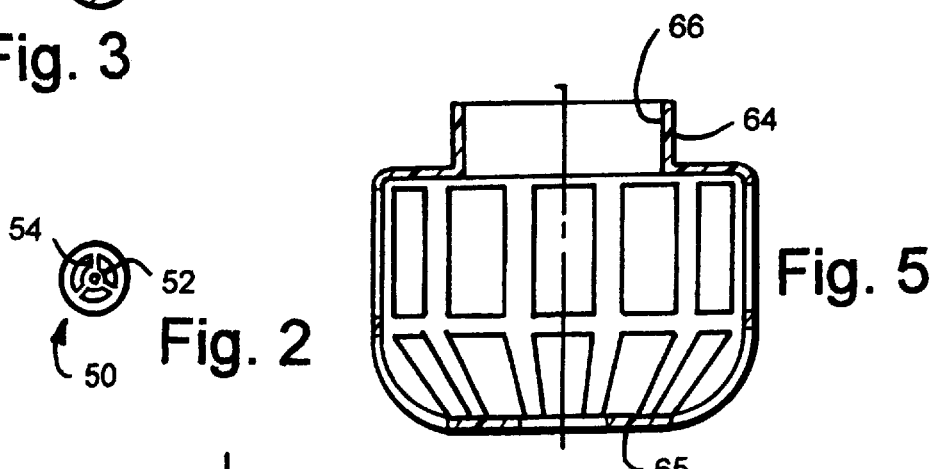
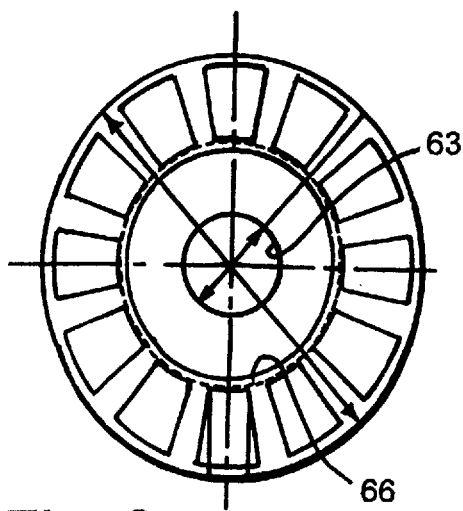
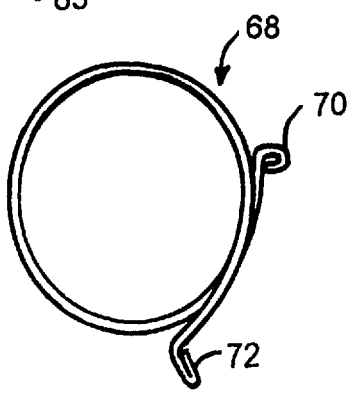

US 6,179,558 B1

FILTERING PUMP ASSEMBLY

BACKGROUND OF THE INVENTION

1. Field of the Invention

The present invention relates to a filtering pump assembly. More particularly, the present invention relates to a portable pump assembly which includes a filter subassembly with a cage member for surrounding an inlet of a pump subassembly, and a replaceable filter element for covering the cage member.

2. Description of the Background Art

Many different types of portable pumps are known. For example, U.S. Pat. No. 4,741,664 to Olmstead et al. discloses a portable pump that is suitable for pumping a corrosive liquid out of a standard 55 gallon drum. In the pump design of Olmstead, an inner tube is positioned coaxially within an outer tube, and a driven shaft is disposed coaxially inside of the inner tube. The inner tube protects the shaft from being contacted by the liquid being pumped through the intermediate space between the inner and outer tubes. A motor sits atop the assembly for spinning the shaft, and the shaft has an impeller mounted on the lower end thereof.

Another portable pump design, similar to the design of Olmstead, is disclosed in U.S. Pat. No. 4,627,790 to Bowes et al.

Although the known portable pumps are useful for their intended purposes, a need still exists in the art for a pump having the ability to pre-filter the fluid being pumped therethrough to prevent entry of larger impurities thereinto. In particular, a need exists for a pump design in which a filter medium is removable and replaceable.

SUMMARY OF THE INVENTION

The present invention provides a filtering pump assembly, including a pump subassembly and a filter subassembly.

The pump subassembly has an inlet portion with a first cross-sectional shape. The preferred cross-sectional shape of the inlet portion is circular, since the preferred pump inlet shape is cylindrical.

The filter subassembly includes a foraminous cage member, having an opening formed therein of a shape corresponding to the first cross-sectional shape of the inlet portion, and configured to fit engagably thereon. The filter subassembly also includes a filter element formed of a porous material for placement in covering relation to the cage member. The preferred filter element is bag-shaped for placement covering and substantially surrounding the cage member.

Preferably, the filter assembly includes retaining means for retaining the filter element in covering relation to the cage member. The retainer may be an annular spring clip having two ends which overlap one another, and having a finger grip formed at each end thereof.

Accordingly, it is an object of the present invention to provide a filter assembly which is effective to both filter and pump a fluid material.

It is a further object of the present invention to provide a filtering pump assembly which includes a removable and replaceable filter element.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 2 is a lower plan view of a support structure which is another component of the assembly of FIG. 1;

FIG. 3 is a lower plan view of an impeller which is another component of the assembly of FIG. 1;

FIG. 4 is side plan detail view of a cage member which may be one component of the assembly of FIG. 1, also showing a pump pickup tube partially cut away;

FIG. 5 is a cross-sectional view of the cage member of FIG. 4, taken along the line 5—5 thereof;

FIG. 6 an end plan view of the cage member of FIGS. 4–5;

FIG. 7 is a top plan view of a spring clamp which is another component of the assembly of FIG. 1;

DETAILED DESCRIPTION OF THE PREFERRED EMBODIMENT

OVERVIEW

Figure 1:
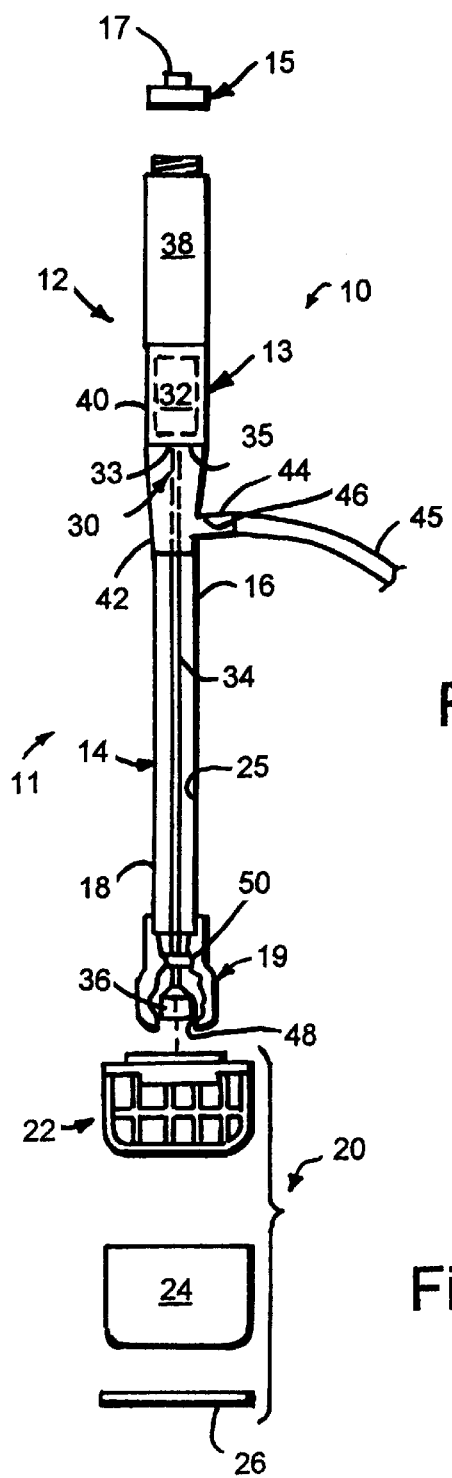
FIG. 1 is an exploded plan view of a portable filter assembly in accordance with the present invention.

Referring now to FIG. 1 of the drawings, a filtering pump assembly, in accordance with the present invention, is shown generally at 10. The filtering pump assembly 10 includes a pump subassembly 11 and a filter subassembly 20, which fits slidably and interferingly on to an impeller housing 19, which forms the inlet 48 at the lower end of the pump subassembly.

FIG. 4 illustrates a cage member 22 which is one component of the filter subassembly, interferingly fit over a generic pump inlet tube 21. In the illustration of FIG. 4, the pump which is attached to the pump inlet tube 21 may be a hand operated pump, a foot operated pump such as for example, an air pump, or an electric pump of the type shown in FIG. 1. Each of these types of pumps is known and is commercially available, and is usable with the filter subassembly 20 in the practice of the present invention.

The electric pump subassembly 11 as illustrated in FIG. 1 includes an external shell 12 surrounding and housing a mechanical drive drain 30. Pump subassemblies, of the general type described herein, are known and commercially available, but it is the applicant's understanding and belief that the known pump subassemblies do not include filters having replaceable filter elements, or any structure similar to the filter subassembly 20 as shown and described herein.

The external shell 12 of the pump subassembly 11 includes a case 13, a pickup tube 14 attached to the case, and an impeller housing 19 attached to a lower end 18 of the pickup tube.

The drive train 30 includes a motor 32, a drive shaft 34, and an impeller 36 which is disposed inside of the impeller housing 19.

The filter subassembly 20 includes a cage member 22 which fits on and partially surrounds the impeller housing 19, a porous filter element 24 which fits over and surrounds the cage member 22, and means 26 for retaining the filter element in covering relation to the cage member.

Each of the above-described components of the assembly 10 will be described in further detail herein.

THE PUMP SUBASSEMBLY

A. The External Shell

The external shell 12 is provided to house and protect the mechanical drive train 30, and to provide fluid flow passages therein, for the transport of fluid through the assembly 10. The shell 12 includes a case member 13 which may, optionally, include a battery case 38 for housing batteries to supply power for the filtering pump assembly 10. Where the assembly 10 is intended to be battery powered, a threadably removable cap 15 may be provided, which may include an integral switch assembly 17. In such a configuration, electrical connections of the known and conventional type are used to form an interruptible circuit inside the battery case 38, to selectively activate the motor 32, as needed.

Alternatively, the pump assembly may be constructed and arranged to run off of a power wire (not shown) which could be connectable to a 12 volt vehicle battery, such as by a plug to fit into a cigarette lighter outlet.

In a third alternative, the assembly 10 could be made to plug in to a standard 110 volt outlet using standardized components.

The shell 12 also includes a motor housing section 40 for housing and containing the motor 32, which is preferred to be an electric motor. The motor 32 includes a central shaft 33.

The case member 13 also includes a fluid outlet fitting 42 below the motor housing section 40, and the outlet fitting has a fluid outlet port 44 formed integrally therein. The interior of the fluid outlet fitting 42 is hollow. The outlet fitting also has an upper plate 35 extending across the top portion thereof, and the upper plate has a central aperture formed therethrough, to allow the shaft 34 to pass through and connect to the motor 32. The upper plate 35 of the outlet fitting 42 is otherwise sealed off, so that fluid flowing through the hollow interior thereof is not allowed to flow into the motor housing section 40. A hose 45 may be provided attached to the outlet port 44, to direct fluid flowing outwardly therefrom to a location selected by a user.

As used throughout the present specification, relative positional terms like "upper", "lower", "above", "below", and the like are used in reference to the orientation of the assembly 10 as shown in FIG. 1, which is the preferred operational orientation thereof. It will be understood, however, that the assembly 10 could be turned on its side or inverted, and if so turned, these positional terms would no longer apply. These terms are used for illustrative purposes to assist the reader in understanding the structure of the illustrated embodiment, and are not intended to limit the invention.

The shell 12 also includes a pickup tube 14, which is sealably attached to the lower end of the fluid outlet fitting 42. The pickup tube 14 has an upper end 16 adjacent the fluid outlet fitting 42, and a lower end 18 opposite the upper end. The pickup tube 14 is hollow and defines a first flow passage 25 therein for allowing fluid flow therethrough. The fluid outlet port 44 defines a second flow passage 46 therein which is in fluid communication with the first flow passage 25 of the pickup tube 14.

The external shell 12 further includes the impeller housing 19, which is attached to the lower end 18 of the pickup tube 14, and which has an inlet opening 48 formed in the lower end thereof for receiving fluid therein.

Preferably, the impeller housing 19 includes an integral support structure 50 therein for reinforcingly supporting the lower portion of the shaft 34 to stabilize rotational movement of the shaft and the associated impeller 36. One possible configuration of a usable support structure 50 is illustrated in FIG. 2. The support structure 50 illustrated in FIG. 2 includes an eyelet 52 for receiving the shaft 34 therethrough, and three support arms 54 spaced at equal intervals of approximately 120 degrees about the eyelet, to connect it to the outer wall of the impeller housing. Those in the relevant art will realize that alternative equivalent structures could be used, and that other numbers of support arms 54 could be provided.

B. The Drive Train

The drive train includes the motor 32, the shaft 34 and the impeller 36. The motor 32 is preferred to be a conventional electric motor. The shaft 34 is operatively connected to the motor 32 for movement thereby. Preferably, the shaft is directly coupled to the central shaft 33 of the motor for concurrent movement therewith. The impeller 36 is glued on to, or is otherwise fixedly attached, in known fashion, to the lowermost end of the shaft 34 for spinning movement therewith. As seen in the detail view of FIG. 3, the impeller has a plurality of blades 56 extending radially outwardly from the central portion thereof, to push fluid outwardly in the impeller housing 19, and thereby to pump fluid upwardly through the inlet tube 14, and out of the outlet port 44.

THE FILTER SUBASSEMBLY

As noted in the overview section, the filter subassembly includes a cage member 22 which fits on the outside of and partially surrounds the impeller housing 19, a porous filter element 24 which fits over and surrounds the cage member 22, and retainer means 26 for retaining the filter element in covering relation to the cage member.

A. The Cage Member

Referring now to FIGS. 4–6, it will be seen that the cage member 22 is formed in the general shape of a foraminous basket 60, with a plurality of apertures 62 formed therein to allow fluid flow therethrough. The basket 60 may also have a central aperture 63 formed in a floor portion 65 thereof.

The basket 60 has an integrally formed cylindrical collar 64 extending upwardly at the top thereof, and the collar 64 has a circular opening 66 formed centrally therein to slidably and interferingly receive the impeller housing 19, so that the cage member may be protectively placed on the pump subassembly 11. The circular opening 66 is also shown in phantom by the broken line in FIG. 6. The circular opening 66 conforms to the exterior shape of the impeller housing 19, which defines the inlet portion of the pump subassembly 11.

While the embodiment of FIGS. 4–6 shows the collar 64 having a reduced diameter as contrasted with the basket 60, the collar could, alternatively, be made the same width as the top of the basket, if desired, without departing from the contemplated scope of the invention.

Figure 8:
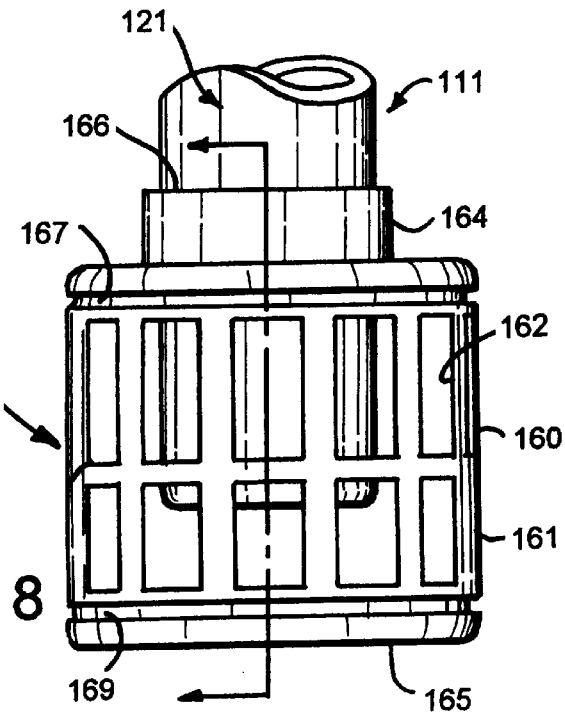
FIG. 8 is a side plan detail view of an alternate cage member, also showing a pump pickup tube partially cut away.

Referring now to FIG. 8, an alternative embodiment of a cage member is shown at 122, placed over and surrounding a generic pump inlet tube 121. In this embodiment, the cage member 122 is formed in the general shape of a cylinder 160, with a plurality of apertures 162 formed in the side wall 161 thereof to allow fluid flow therethrough. The cage member 122, in the embodiment of FIG. 8, has a flat and solid floor portion 165 at the bottom thereof. The side wall 161 also has upper and lower circumferential grooves 167, 169 formed therein above and below the apertures 162, to receive retainers therein to retain a filter sleeve 124 thereon.

The cage member 122 also has an integrally formed cylindrical collar 164 extending upwardly at the top thereof, and the collar 164 has a circular opening 166 formed centrally therein to slidably and interferingly receive the pump inlet tube 121, so that the cage member 122 may be protectively placed on the pump subassembly 111. The circular opening 66 conforms to the exterior shape of the pump inlet tube 121, which defines the inlet portion of the pump subassembly 111.

B. The Filter Element

Figure 9:
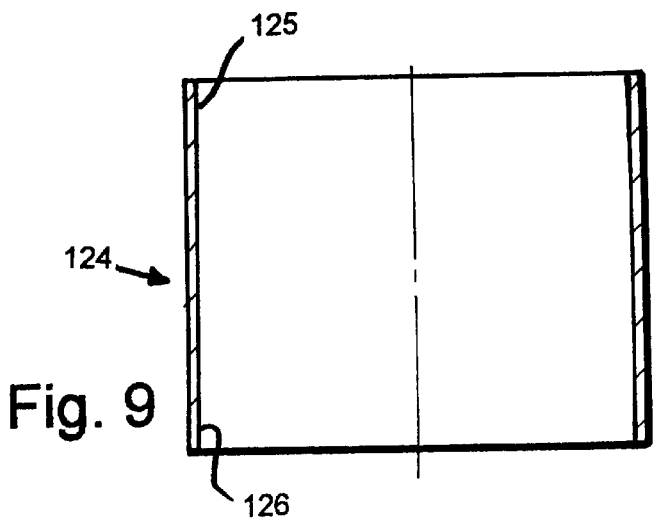
FIG. 9 is a cross section of an alternate filter element usable with the cage member of FIG. 8.

The filter element 24, 124 is formed from a porous material such as a non-woven plastic or a durable filter paper. Preferably, the material of the filter element 24, 124 is made to be heat resistant to enable the filtering pump assembly 10 to pump hot fluids therethrough such as, e.g., hot cooking oil from a deep fryer apparatus. It is further preferred to make the filter element 24, 124 disposable and replaceable, and to provide a plurality of identical filter elements together with a single filtering pump assembly 10, to allow changing of the filter element when it becomes clogged.

Where using the basket-shaped cage member 22 of FIG. 4, the filter member, 24 is preferred to be formed in a bag shape, to cover and surround the cage member. Alternatively, where the cage member 122 is cylindrically shaped with a solid floor 165, as shown in FIG. 8, the filter element is preferred to be made as a hollow sleeve 124 (FIG. 9) having openings 125, 126 formed in the top and bottom thereof. This sleeve may be slidably placed over the cage member 122 of FIG. 8, and then retaining means, such as a pair of identical spring clips 68 as shown in FIG. 7, may be placed at the top and bottom of the sleeve 124, engagably resting in the grooves 167, 169 of the cage member 122 to sealably retain the sleeve thereon.

As an alternative type of filter member, a permanent filter member could be provided in the form of a foraminous sheathing for the cage member 22 or 122 having a multiplicity of closely spaced holes formed therein. Such a permanent filter member could be made of stainless steel with a multiplicity of holes formed therein, or could be made of a durable metal screen material.

C. The Retaining Means

The means 26 for retaining the filter element 24 in covering relation to the cage member 22 is preferred to comprise a circular spring clip 68 having finger grips 70, 72 disposed at opposite ends thereof, as shown in FIG. 7. However, equivalent structure for the retaining means 26 could be provided by a hose clamp, by a stretchable heat-resistant o-ring, or by a wire member, to suggest a few examples.

Although the present invention has been described herein with respect to a preferred embodiment thereof, the foregoing description is intended to be illustrative, and not restrictive. Those skilled in the art will realize that many modifications of the preferred embodiment could be made which would be operable.

For example, an equivalent structure contemplated by the present invention, for the filter subassembly, might be to have a solid floor on a modified cylindrical cage member (not shown) having straight vertical side walls with openings 62 formed only in the side walls, and to have the filter element take the form of an annular sleeve (not shown) having openings formed in both the top and bottom thereof. In such an alternate embodiment, fastener means such as the spring clip of FIG. 7 would be provided at both the top and bottom of the modified cage member.

Another variation contemplated by the present invention is that the filter subassembly 20, as shown and described herein, could be used with a hand-operated pump in place of the electric pump shown in the drawings.

All such modifications, which are within the scope of the claims, are intended to be within the scope and spirit of the present invention.

What is claimed is:

1. A portable for pumping and filtering a fluid, comprising:
   a pump subassembly having an inlet portion with a first cross-sectional shape, and
   a filter subassembly, comprising:
      a foraminous cage member having an opening formed therein of a shape corresponding to the first cross-sectional shape of the inlet portion and being configured to fit engagably thereon; and
      a filter element formed of a porous material for placement in covering relation to the cage member.

2. The filtering pump assembly of claim 1, wherein the filter subassembly further comprises means for retaining the filter element in covering relation to the cage member.

3. The filtering pump assembly of claim 1, wherein the retaining means comprises an annular spring clip having two ends which overlap one another, and having a finger grip formed at each end thereof.

4. The filtering pump assembly of claim 1, wherein the filter element comprises a bag for placement covering and surrounding the cage member.

5. The filtering pump assembly of claim 1, wherein the filter element comprises a screen.

6. The filtering pump assembly of claim 1, wherein the first cross-sectional shape is circular.

7. The filtering pump assembly of claim 1, wherein the pump subassembly is electrically operated.

8. The filtering pump subassembly of claim 1, wherein the cage member is substantially cylindrical in shape, and the filter element comprises a hollow sleeve which slidably fits over the cage member.

9. A portable filtering pump assembly for pumping and filtering a fluid, the assembly comprising a pump subassembly and a filter subassembly; the pump subassembly comprising:
   a case;
   a motor disposed within the case and having a central shaft;
   a pickup tube attached to the case and extending downwardly therefrom, said pickup tube having an upper end and a lower end and defining a first flow passage therein;
   a drive shaft coaxially disposed in the pickup tube and operatively attached to the central shaft of the motor for movement thereby;
   an impeller attached to the drive shaft substantially opposite the motor;
   an impeller housing attached to the lower end of the pickup tube and surrounding the impeller, said impeller housing having an outer wall;
   an outlet port disposed proximate the upper end of the pickup tube and defining a second flow passage therein which is in fluid communication with the first flow passage; and the filter assembly comprising
      a foraminous cage operatively attached to, and partially surrounding the impeller housing; and a filter element formed of a porous material for placement in covering relation to the cage member.

10. The pump assembly of claim 1, wherein the pump subassembly comprises a case comprising a battery housing for storing one or more batteries therein, and an electric motor disposed within the case below the battery housing.

11. The pump assembly of claim 1, wherein said cage member comprises a foraminous basket with a plurality of apertures formed therein;

and wherein said basket includes an integrally formed collar extending outwardly thereon, said collar having an opening formed centrally therein to slidably and interferingly receive said inlet portion of said pump subassembly therein.

12. The pump assembly of claim 9, wherein said cage member comprises a foraminous basket with a plurality of apertures formed therein;

and wherein said basket has an integrally formed cylindrical collar extending outwardly thereon, said cylindrical collar having a circular opening formed centrally therein to slidably and interferingly receive said impeller housing therein.

13. The pump assembly of claim 9, wherein the impeller housing comprises means for supporting a portion of the drive shaft.

14. The pump assembly of claim 13, wherein said drive shaft support means comprises an eyelet for receiving the shaft therethrough, and a plurality of support arms interconnecting said eyelet to the outer wall of the impeller housing.

15. The pump assembly of claim 9, wherein the case has a battery storage compartment formed therein, and wherein the motor is disposed below the battery storage compartment.

* * * * *

UNITED STATES PATENT AND TRADEMARK OFFICE
CERTIFICATE OF CORRECTION

PATENT NO.   : 6,179,558 B1
DATED        : January 30, 2001
INVENTOR(S)  : Eastman, III et al.

It is certified that error appears in the above-identified patent and that said Letters Patent is hereby corrected as shown below:

<u>Column 6,</u>
Line 11, after "portable" insert -- filtering pump assembly --.

Signed and Sealed this

Fourteenth Day of May, 2002

Attest:

Attesting Officer

JAMES E. ROGAN
*Director of the United States Patent and Trademark Office*